Oct. 21, 1969 W. HEISSMEIER ET AL 3,474,430

MAGNETIC RECORD MEDIUM WITH EDGE AREAS OF POLARITY OPPOSITE THAT OF CENTER AREA

Filed Oct. 22, 1965

United States Patent Office 3,474,430

Patented Oct. 21, 1969

3,474,430

MAGNETIC RECORD MEDIUM WITH EDGE AREAS OF POLARITY OPPOSITE THAT OF CENTER AREA

Walter Heissmeier, Karl Klein, and Wolfgang Wagnerberger, Nuremberg, Germany, assignors to Siemens Aktiengesellschaft, Erlangen, Germany, a corporation of Germany Filed Oct. 22, 1965, Ser. No. 501,178
Claims priority, application Germany, Mar. 18, 1965, S 96,032
Int. Cl. G11b 5/38
U.S. Cl. 340—174.1 2 Claims

ABSTRACT OF THE DISCLOSURE

A premagnetized record medium to be read by a Hall effect head. Each track is made up of a center portion of one polarity and edge portions of the opposite polarity. A signal is indicated by an inversion of the respective polarizations of the premagnetized portions.

The present invention relates to a magnetic record medium and a method of recording on a magnetic record medium. More particularly, the invention relates to a method of recording on a magnetic record medium and a magnetic record medium which is read out by a Hall generator.

Magnetic record media and methods of recording on magnetic record media heretofore utilized produce an insufficient voltage slope at readout. Thus, the following relationship could not be realized:

$$V_R < 0.01\ dV/dt$$

and $$V_0 < 0.01\ dV/dt$$

wherein $V_R$ is the remanence voltage, $V_0$ is the temperature-dependent Hall voltage and $dV/dt$ is the voltage slope.

The principal object of the present invention is to provide a new and improved magnetic record medium.

An object of the present invention is to provide a new and improved method of recording on a magnetic record medium.

Another object of the present invention is to provide a magnetic record medium and method of recording on a magnetic record medium which produce a steep voltage slope at readout.

Another object of the present invention is to provide a magnetic record medium and method of recording on a magnetic record medium which store and permit readout of a signal with accuracy, efficiency, effectiveness and reliability.

Another object of the present invention is to provide a magnetic record medium and method of recording on a magnetic record medium which permit readout by a Hall generator of a desired signal without adverse effect by adjacent signals.

Another object of the present invention is to provide a magnetic record medium and method of recording on a magnetic record medium which produce a precisely positioned, steep, zero passage voltage slope at readout.

In accordance with the present invention, a magnetic record medium of elongated configuration having a length, a pair of spaced edges extending along its length parallel to each other and a center extending along its length substantially equidistantly from the edges, comprises a premagnetized single polarity central linear area extending along the length of the record medium at the center thereof. A premagnetized edge linear area of the opposite polarity extends along the length of the record medium at each edge thereof. A signal is recorded on the record medium and indicated by a signal magnetization of opposite polarity to that of the corresponding premagnetized central and edge areas in a transverse strip of the record medium. The signal magnetization and the premagnetized areas produce a pair of spaced substantially parallel transverse strips of flux comprising flux lines extending in the direction of length of the record medium and directed in opposition to each other at the transverse edges of the transverse strip.

In accordance with the method of the present invention, the recording of a signal on a magnetic record medium comprises the steps of premagnetizing a central linear area extending along the length of the record medium at the center thereof with a single polarity, premagnetizing an edge linear area extending along the length of the record medium at each edge thereof with the opposite polarity, and magnetizing the corresponding premagnetized central and edge areas in a transverse strip of the record medium with the opposite polarity from that of the central and edge areas to indicate a signal recorded on the record medium.

In order that the present invention may be readily carried into effect, it will now be described with reference to the accompanying drawing, wherein.

Figure 1:
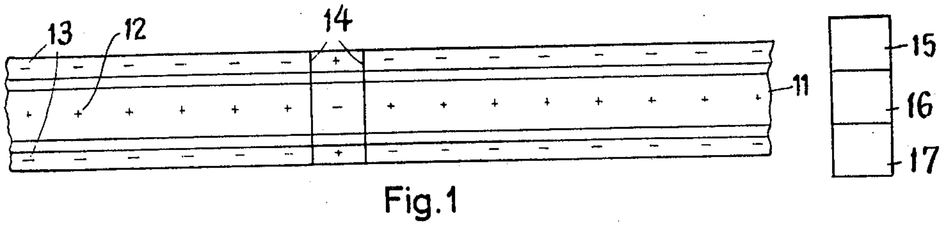
FIG. 1 is a view of an embodiment of the magnetic record medium of the present invention provided by the method of recording of the present invention.

In FIG. 1, the magnetic record medium comprises a magnetic band 11, premagnetized, in accordance with the present invention, with a single polarity along the length of the record medium at the center thereof and with the opposite polarity along the length of the record medium at each edge thereof. In the illustrated example, the central polarity 12 is positive and the edge polarities 13 are negative, although, of course, the central polarity 12 may be negative and the edge polarities 13 may be positive.

A signal 14 is stored or recorded on the magnetic record medium 11 by reversing the premagnetized polarities. Thus, in the illustrated example, the central positive polarity 12 is changed to negative and the edge negative polarities 13 are changed to positive by the stored signal 14. If the central polarity 12 were negative and the edge polarities 13 were positive, they would be changed to positive and negative, respectively, by the stored signal 14. The signal 14 is defined in the figures by its transverse limits 14. The record medium 11 may be premagnetized and magnetized by any suitable means such as, for example, magnetic heads 15, 16 and 17 positioned in operative proximity with said record medium, the record medium being made to pass under said magnetic heads.

Figure 2:
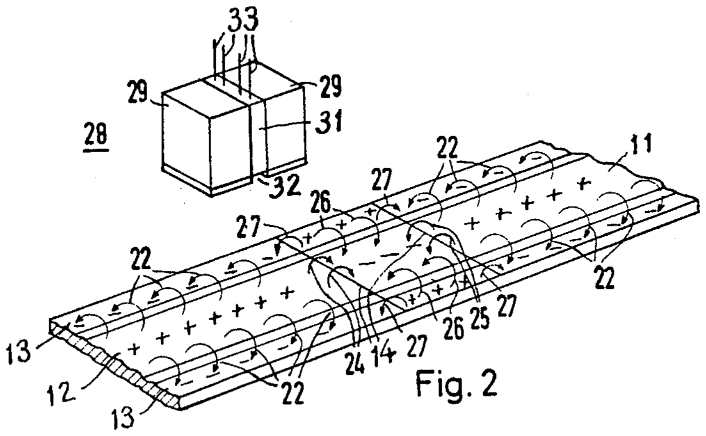
FIG. 2 is a perspective view of an embodiment of the magnetic record medium of the present invention provided by the method of recording of the present invention and illustrating magnetic fluxes and a Hall generator readout head.

In FIG. 2, the premagnetization magnetic flux 22 is provided from the central positive polarity 12 to the edge negative polarities 13 along the length of the record medium 11. The magnetization flux 24, 25, 26 and 27, produced by the reversal of the premagnetization polarities in storing the signal 14, also extends from the positive to the negative polarities. The signal magnetization flux 26 thus extends along the length of the record medium as does the premagnetization flux 22, but in the opposite direction. The signal magnetization flux 24 and 25, however, extends along lines transverse to the record medium 11 in directions from the premagnetization central positive polarity 12 to the signal central negative polarity and the signal magnetization flux 27 extends along lines transverse to the record medium in directions from the signal edge positive polarities to the premagnetization edge negative polarities. When the flux is said to extend along the length of the record medium 11, it is actually transverse to the record medium in direction, and when the flux is said to extend along lines transverse to the record medium, it is actually parallel to the length of the record medium in direction.

A Hall generator readout head 28 may be utilized to read out the signal 14. The Hall generator readout head 28 comprises a pair of spaced substantially parallel ferrite plates 29, a Hall plate 31 positioned between said ferrite plates in parallel relation thereto in a manner which leaves an air gap 32 between said ferrite plates and under said Hall plate, and control current and Hall output terminals 33 connected to said Hall plate. Since the Hall generator 28 only senses a magnetic field which is perpendicular to the Hall plate 31, it senses only the flux 24 and 25 when it is positioned in operative proximity with the record medium 11 at the center of the signal 14 and with the Hall plate extending transverse to the edges of the record medium and perpendicular to the surface thereof.

Figure 3:
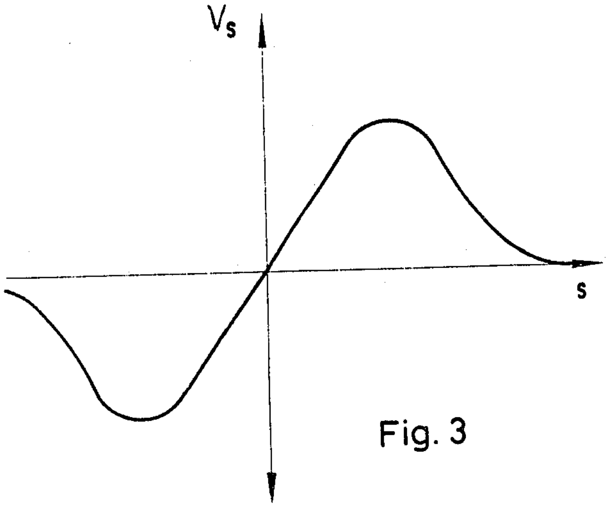
FIG. 3 is a graphical presentation of the readout signal provided by the readout head of FIG. 2.

FIG. 3 shows the readout signal read out from the record medium 11. In FIG. 3, the abscissa represents the distance *s* of the readout head from the signal 14 and the ordinate represents the signal voltage V*s* provided by the readout head. As shown by the signal voltage curve of FIG. 3, as the readout head 28 approaches the signal 14 along the length of the record medium 11 from a distance at which the Hall output voltage is zero, the head reaches a point, at which it is close enough to the signal, at which it is subject to the signal magnetization flux, to produce a Hall output voltage which then gradually increases, as shown, in either a positive or negative direction until it reaches a maximum for example, at the flux 24. The Hall output voltage then gradually decreases, as shown, in the same positive or negative direction until the head passes over the center of the signal between the flux 24 and the flux 25, at which point the Hall output voltage is zero. The Hall output voltage then increases in the opposite direction, as the head continues to move in the same direction. This increase and the previous decrease provide a linear slope passing through zero, which is steep, as desired. The Hall voltage gradually increases in the negative or positive direction until it reaches a maximum, for example, at the flux 25, of a polarity opposite that of the previous maximum. The Hall voltage then gradually decreases, as the head continues to move, in the same negative or positive direction until the head reaches a point at which it is no longer close enough to the signal to be subject to the signal magnetization flux, and the Hall output voltage becomes zero.

The magnetic record medium of the present invention permits the readout of an exactly positioned signal for the electronic control of machinery without the necessity for contact between the record medium and the readout head or between the record medium and the machinery.

While the invention has been described by means of a specific example and in a specific embodiment, we do not wish to be limited thereto, for obvious modifications will occur to those skilled in the art without departing from the spirit and scope of the invention.

We claim:

1. A magnetic signal carrier for contact-free production of an exact position signal for an electronic control for a machine tool and the like utilizing premagnetized magnetic tape with signal indications of opposite polarization directions and a readout head having a Hall generator, said magnetic tape comprising a three-part transversely magnetized premagnetized track having a length, a pair of spaced edge parts extending along its length parallel to each other and a center part extending along its length between said edge parts, said center part having a direction of polarization which is opposite that of said edge parts, and wherein signal indications are provided in said premagnetized track by transverse magnetization with polarization directions opposite those of said premagnetized track.

2. A magnetic signal carrier as claimed in claim 1 wherein each of said edge parts has the same width in a direction perpendicular to the direction of length of said magnetic tape.

References Cited

UNITED STATES PATENTS 3,114,010 12/1963 Wolf et al. -------- 179—100.2

BERNARD KONICK, Primary Examiner

J. R. GOUDEAU, Assistant Examiner

U.S. Cl. X.R.

179—100.2; 346—74